United States Patent
Fujioka

(10) Patent No.: US 12,515,480 B2
(45) Date of Patent: Jan. 6, 2026

(54) PNEUMATIC TIRE

(71) Applicant: Toyo Tire Corporation, Itami (JP)

(72) Inventor: Tsuyoshi Fujioka, Itami (JP)

(73) Assignee: TOYO TIRE CORPORATION, Itami (JP)

( * ) Notice: Subject to any disclaimer, the term of this patent is extended or adjusted under 35 U.S.C. 154(b) by 80 days.

(21) Appl. No.: 18/440,395

(22) Filed: Feb. 13, 2024

(65) Prior Publication Data
US 2024/0343072 A1    Oct. 17, 2024

(30) Foreign Application Priority Data
Apr. 13, 2023   (JP) .................. 2023-065548

(51) Int. Cl.
*B60C 11/03*    (2006.01)
*B60C 11/13*    (2006.01)

(52) U.S. Cl.
CPC ...... *B60C 11/1353* (2013.01); *B60C 11/1369* (2013.01); *B60C 2011/0346* (2013.01); *B60C 2011/1361* (2013.01)

(58) Field of Classification Search
CPC ............ B60C 2011/1361; B60C 11/1369
See application file for complete search history.

(56) References Cited

U.S. PATENT DOCUMENTS

| 2007/0151646 A1* | 7/2007 | Ito .................... B60C 11/12 152/DIG. 3 |
| 2013/0180638 A1* | 7/2013 | Washizuka .......... B60C 11/0311 152/209.8 |
| 2018/0001709 A1 | 1/2018 | Fujioka |
| 2018/0201072 A1* | 7/2018 | Fukuda ................ B60C 11/042 |
| 2023/0150312 A1* | 5/2023 | Tsujibayashi ....... B60C 11/1323 152/209.1 |

FOREIGN PATENT DOCUMENTS

JP           2018-1938 A        1/2018

* cited by examiner

*Primary Examiner* — Justin R Fischer
*Assistant Examiner* — Nicholas J Weiler
(74) *Attorney, Agent, or Firm* — WHDA, LLP

(57) ABSTRACT

A pneumatic tire of the present disclosure includes a plurality of main grooves extending along a tire circumferential direction, wherein the plurality of main grooves include at least one zigzag main groove extending in a zigzag shape along the tire circumferential direction, the zigzag main groove includes a plurality of protrusions protruding from a bottom surface of the zigzag main groove, and a plurality of connection portions connecting the plurality of protrusions to a wall surface of the zigzag main groove, and the plurality of protrusions are arranged so as to overlap with each other as viewed in the tire circumferential direction.

18 Claims, 4 Drawing Sheets

PNEUMATIC TIRE

FIELD OF THE INVENTION

Cross-Reference to Related Applications

The present application claims priority based on Japanese Patent Application No. 2023-065548 filed on Apr. 13, 2023, the contents of which are incorporated herein by reference in its entirety.

The present disclosure relates to a pneumatic tire.

Description of the Related Art

Treads of some pneumatic tires are each provided with a zigzag main groove extending in a zigzag shape along a tire circumferential direction, and a bottom surface of the zigzag main groove is provided with a protrusion for ejecting stones from entering the main groove (for example, Patent Document 1). In a case where a plurality of protrusions are provided on the bottom surface of the zigzag main groove, there is a gap between the protrusions, and small stones or the like may enter the gap. It is therefore desirable that a pneumatic tire capable of reducing the possibility of stones from being caught in a gap between protrusions be provided.

PRIOR ART DOCUMENT

Patent Document

Patent Document 1: JP-A-2018-1938

SUMMARY OF THE INVENTION

It is therefore an object of the present disclosure to provide a pneumatic tire capable of reducing the possibility of stones from being caught in a gap between protrusions.

A pneumatic tire of the present disclosure includes a plurality of main grooves extending along a tire circumferential direction, wherein the plurality of main grooves include at least one zigzag main groove extending in a zigzag shape along the tire circumferential direction, the zigzag main groove includes a plurality of protrusions protruding from a bottom surface of the zigzag main groove, and a plurality of connection portions connecting the plurality of protrusions to a wall surface of the zigzag main groove, and the plurality of protrusions are arranged so as to overlap with each other as viewed in the tire circumferential direction.

DETAILED DESCRIPTION OF THE PREFERRED EMBODIMENTS

Figure 1:
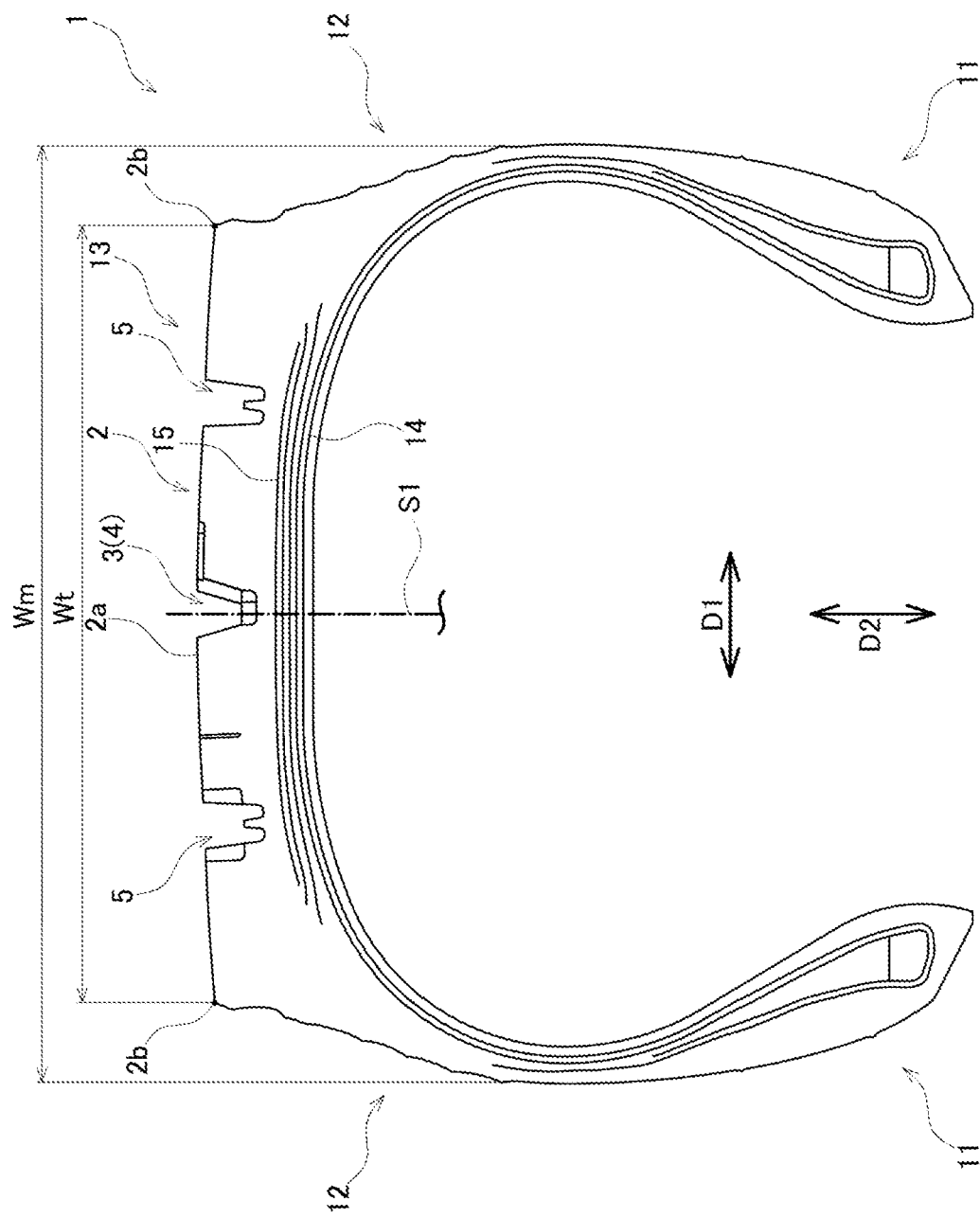
FIG. 1 is a cross-sectional view of a pneumatic tire according to an embodiment on a tire meridian plane.

Hereinafter, an embodiment of a pneumatic tire will be described with reference to FIGS. 1 to 4. Note that a dimensional ratio of the drawing does not necessarily coincide with an actual dimensional ratio in each of the drawings (FIG. 5 as well), and dimensional ratios in the respective drawings do not necessarily coincide with each other.

In each of the drawings, a first direction D1 is a tire axial direction D1 parallel to a tire rotation axis of a pneumatic tire (hereinafter, also simply referred to as a "tire") 1, a second direction D2 is a tire radial direction D2 that is a diameter direction of the tire 1, and a third direction D3 is a tire circumferential direction D3 around the tire rotation axis.

In the tire axial direction D1, the inner side is a side close to a tire equatorial plane S1, and the outer side is a side far from the tire equatorial plane S1. In the tire radial direction D2, the inner side is a side close to the tire rotation axis, and the outer side is a side far from the tire rotation axis.

The tire equatorial plane S1 is a plane orthogonal to the tire rotation axis and located at the center of the tire 1 in the tire axial direction D1, and a tire meridian plane is a plane including the tire rotation axis and orthogonal to the tire equatorial plane S1. A tire equator line L1 is a line along which an outer surface of the tire 1 in the tire radial direction D2 intersects with the tire equatorial plane S1.

As illustrated in FIG. 1, the tire 1 according to the present embodiment includes: a pair of beads 11 and 11; a pair of sidewalls 12 and 12 extending outward in the tire radial direction D2 from the respective beads 11 and 11; a tread 13 continuous with outer ends of the pair of sidewalls 12 and 12 in the tire radial direction D2; and a carcass ply 14 extending between the pair of beads 11 and 11.

The tread 13 includes: a tread rubber 2 having the tread surface 2a that constitutes an outer surface of the tread 13; and a belt ply 15 disposed between the tread rubber 2 and the carcass ply 14. The tread surface 2a has a tire ground contact surface that actually comes into contact with a road surface. Outer ends of the tire ground contact surface in the tire axial direction D1 are referred to as tread ground contact ends 2b and 2b. In the present embodiment, an example where the tire 1 has a square shoulder land 7, and each end of the tread surface 2a in the tire axial direction coincides with the tread ground contact end 2b will be given below.

The tire 1 according to the present embodiment is a heavy-duty pneumatic tire used for trucks or the like, and is configured as a tire for regional use suitable for driving in urban areas or the like, but is not limited to such a configuration. In the present embodiment, the tread 13 is of a wide tread type having a tread width Wt greater than or equal to 80% of a tire maximum width Wm, but is not limited to such a type. The tread width Wt is a maximum width of the tire ground contact surface in the tire axial direction D1, that is, a distance between the tread ground contact ends 2b and 2b. The tire maximum width Wm is a maximum width in the tire axial direction D1 including protrusions such as patterns or characters on surfaces of the sidewalls 12 and 12.

A dimension of each part of the tire 1 is a value measured in a non-load state where the tire 1 is mounted on a normal rim and filled with a normal internal pressure. In a standard system including a standard on which the tire is based, the normal rim is a rim defined for each tire by the standard. The normal rim is, for example, a standard rim in the case of the Japan Automobile Tyre Manufacturers Association (JATMA), or "Measuring Rim" in the case of the Tire and Rim Association, Inc. (TRA) and the European Tyre and Rim Technical Organization (ETRTO). Further, in the standard system including the standard on which the tire is based, the normal internal pressure is an air pressure defined for each tire by the standard. In the case of a tire for a truck/bus or a tire for a light truck, the normal internal pressure is, for example, a maximum air pressure in the case of JATMA, a maximum value described in Table "TIRE LOAD LIMITS AT VARIOUS COLD INFLATION PRESSURES" in the case of TRA, and "INFLATION PRESSURE" in the case of ETRTO. The normal internal pressure is normally set to 180 kPa in the case of a tire for a passenger car, and is set to 220 kPa in the case of a tire specified as Extra Load or Reinforced.

Figure 2:
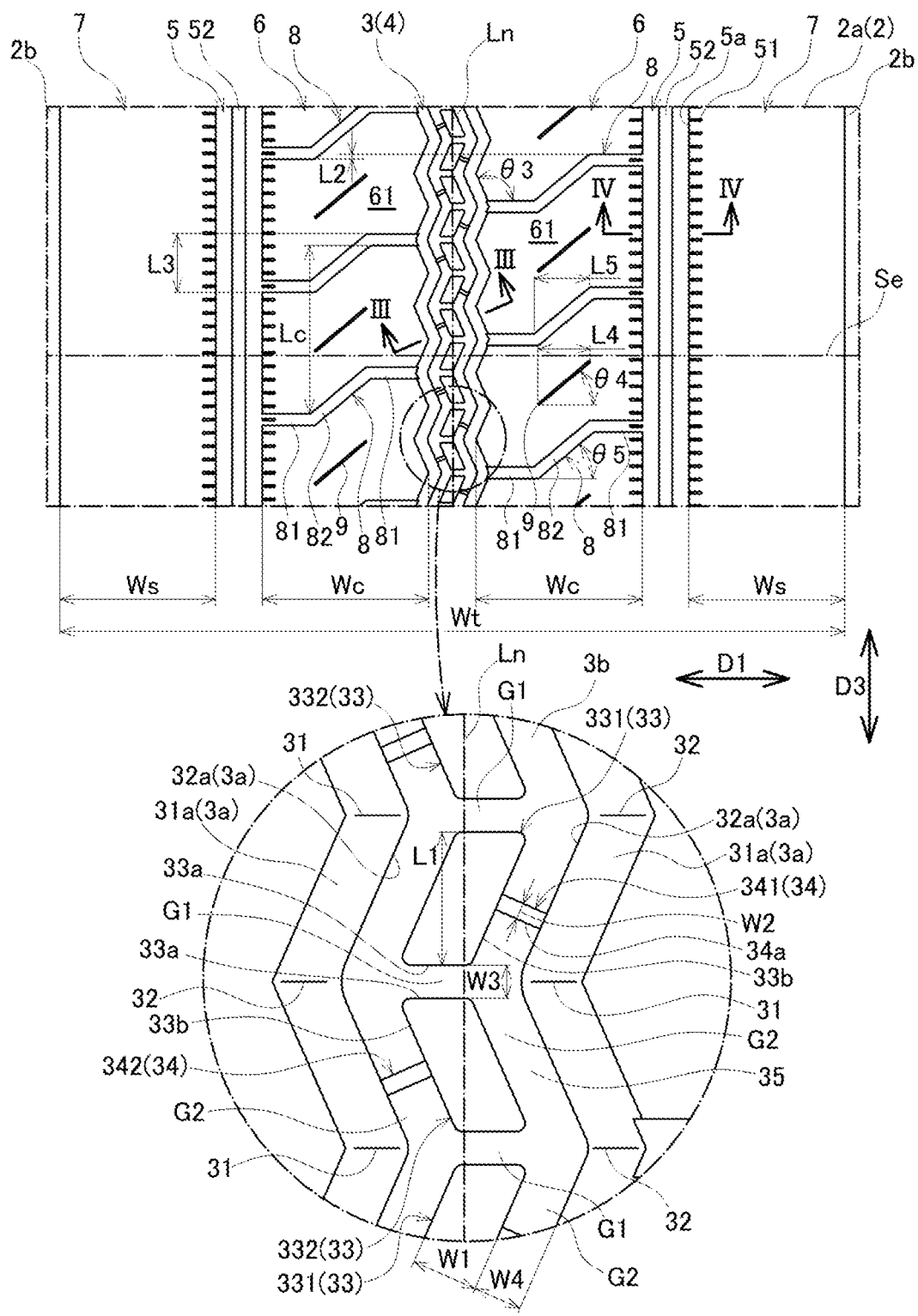
FIG. 2 is a developed view of a tread surface of the pneumatic tire according to the embodiment.

As illustrated in FIG. 2, the pneumatic tire 1 includes a plurality of main grooves 4 and 5 formed on the tread surface 2a and extending along the tire circumferential direction D3. The plurality of main grooves 4 and 5 include at least one zigzag main groove 3 extending in a zigzag shape along the tire circumferential direction D3. The plurality of main grooves 4 and 5 include a pair of shoulder main grooves 5 and 5 located on outermost sides in the tire axial direction D1, and a center main groove 4 located between the pair of shoulder main grooves 5 and 5. The plurality of main grooves 4 and 5 are provided at intervals in the tire axial direction D1.

In the present embodiment, the number of the main grooves 4 and 5 is three in total including one center main groove 4 and two shoulder main grooves 5 and 5. This makes it possible to make widths of lands 6 and 7 to be described later large enough and increase rigidity of the lands 6 and 7. It is further possible to make groove widths of the main grooves 4 and 5 large enough and provide a gap G2 between a protrusion 33 and a main groove wall surface 3a to be described later. The number of the main grooves 4 and 5 may be at least four.

In the present embodiment, the center main groove 4 is the zigzag main groove 3. The zigzag main groove 3 is provided between the pair of shoulder main grooves 5 and 5. The use of the zigzag main groove 3 as the center main groove 4 formed in a region where the ground contact pressure is relatively high allows an increase in traction performance of the tire 1. Note that each shoulder main groove 5 may be the zigzag main groove 3, and a plurality of zigzag main grooves 3 (center main grooves 4) may be provided.

The zigzag main groove 3 (center main groove 4) extends in a zigzag shape with repeated bends along the tire circumferential direction D3. A plurality of projections 31 and a plurality of depressions 32 are formed by the main groove wall surface 3a (also simply referred to as "wall surface 3a") of the zigzag main groove 3, and are provided alternately along the tire circumferential direction D3. The projections 31 project toward the inside of the zigzag main groove 3. The depressions 32 are recessed in a direction opposite to the direction in which the projections 31 project.

The projections 31 each coincide with a corresponding depression 32 formed by the main groove wall surface 3a facing the projection 31 as viewed in the tire axial direction D1. The depressions 32 each coincide with a corresponding projection 31 formed by the main groove wall surface 3a facing the depression 32 as viewed in the tire axial direction D1. The zigzag main groove 3 has linear sections 35 extending linearly between the projections 31 and the depressions 32. The linear sections 35 are inclined relative to the tire circumferential direction D3, and as illustrated in FIG. 2, the linear sections 35 whose inclination directions are opposite to each other are alternately arranged one by one.

A distance between depressions 32 adjacent to each other in the tire circumferential direction D3 is defined as 1 pitch of repetitive pitches of the depressions 32. A distance between a projection 31 and a depression 32 adjacent to the projection 31 in the tire circumferential direction D3 is a half pitch. The same applies to the following "pitch".

It is preferable that each shoulder main groove 5 extend linearly along the tire circumferential direction D3. A region where each shoulder main groove 5 is formed is low in ground contact pressure as compared with the region where the center main groove 4 is formed, so that required traction performance is low. It is therefore possible to suppress, by making each shoulder main groove 5 extend linearly, uneven wear of each of the lands 6 and 7 to be described later.

Figure 3:
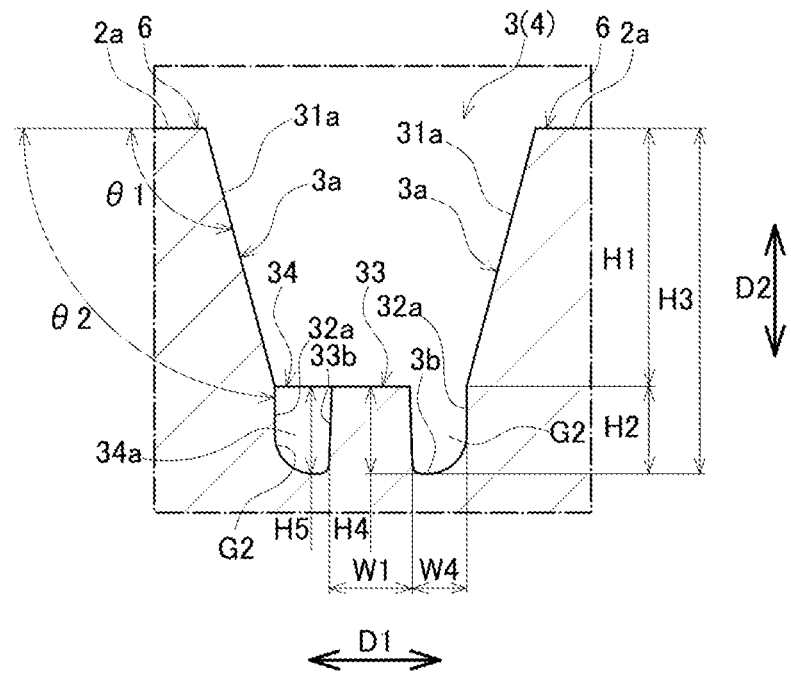
FIG. 3 is an enlarged cross-sectional view taken along a line III-III of FIG. 2.

As illustrated in FIGS. 2 and 3, the zigzag main groove 3 includes a plurality of the protrusions 33 protruding from a bottom surface 3b of the zigzag main groove 3, and a plurality of connection portions 34 connecting the plurality of protrusions 33 to the main groove wall surface 3a of the zigzag main groove 3. It is possible to make, by providing the protrusions 33, small stones or the like less liable to enter the zigzag main groove 3 and reduce the possibility of stones being caught in the zigzag main groove 3. It is possible to reinforce, by providing the connection portions 34, the protrusions 33 and reduce the possibility of the protrusions 33 being chipped due to caught stones.

The plurality of protrusions 33 are arranged so as to overlap with each other as viewed in the tire circumferential direction D3. It is therefore possible to draw, like the tire equator line Ln illustrated in FIG. 2, one imaginary line extending in the tire circumferential direction D3 through each of the plurality of protrusions 33 provided in the zigzag main groove 3. Such a configuration makes it possible to reduce exposure of a gap G1 between the protrusions 33 and 33 as viewed in the tire circumferential direction D3. This makes it possible to make small stones or the like less liable to enter the gap G1 and reduce the possibility of stones being caught in the gap G1 between the protrusions 33 and 33.

It is preferable that the protrusions 33 be each provided at the center of the bottom surface 3b of the zigzag main groove 3 in the tire axial direction D1. The gap G2 is provided between the protrusions 33 and the main groove wall surface 3a. The connection portions 34 are each provided in the gap G2.

It is preferable that the protrusions 33 be each provided between a corresponding projection 31 and a corresponding depression 32 (in a corresponding linear section 35 of the zigzag main groove 3). This makes it possible to suppress deformation of the linear sections 35 of the zigzag main groove 3 when the tire comes into contact with the ground (deformation to cause a pair of main groove wall surfaces 3a and 3a to warp to come closer to each other, or the like) and suppress uneven wear of the center land 6. It is further possible to make, by suppressing deformation of the linear sections 35 of the zigzag main groove 3 when the tire comes into contact with the ground, small stones or the like less liable to be held by the main groove wall surface 3a and reduce the possibility of stones being caught in the zigzag main groove 3. It is more preferable that one protrusion 33 be provided in one linear section 35.

The protrusions 33 are each formed in a shape having a longitudinal direction as viewed in the tire radial direction D2. The longitudinal direction of each protrusion 33 is along the tire circumferential direction D3. A dimension (length L1) of each protrusion 33 in the tire circumferential direction D3 is longer than a dimension of the protrusion 33 in the tire axial direction D1. In the present embodiment, the protrusions 33 are each formed in a parallelogram shape as viewed in the tire radial direction D2. The protrusions 33 each have a pair of sides extending in the tire axial direction D1 and a pair of sides extending between the pair of sides extending in the tire axial direction D1 along a corresponding linear section 35 as viewed in the tire radial direction D2. Note that the protrusions 33 are not limited to protrusions having a parallelogram shape, and may have a rectangular shape or the like.

Protrusions 33 adjacent to each other are symmetrically arranged with respect to the tire meridian plane passing through the gap G1. In the present embodiment, each of the plurality of protrusions 33 is provided on the tire equator line Ln. The length L1 of each protrusion 33 in the tire circumferential direction D3 is less than the distance (half pitch) between a corresponding projection 31 and a depression 32 adjacent to the projection 31 in the tire circumferential direction D3.

A surface of each protrusion 33 along the tire axial direction D1 is defined as a first protrusion wall surface 33a, and a surface of the protrusion 33 along the tire circumferential direction D3 is defined as a second protrusion wall surface 33b. It is preferable that the protrusion wall surfaces 33a and 33b be almost orthogonal to the bottom surface 3b (up to an inclination of 5 degrees or less, and the same applies to the following). It is preferable that the second protrusion wall surface 33b be almost parallel to a second main groove wall surface 32a to be described later (up to an inclination of 5 degrees or less, and the same applies to the following).

It is preferable that the first protrusion wall surface 33a be almost parallel to the tire meridian plane passing through each protrusion 33. It is preferable that the first protrusion wall surface 33a be almost parallel to the first protrusion wall surface 33a of an adjacent protrusion 33, and the gap G1 between the first protrusion wall surfaces 33a extends linearly along the tire axial direction D1. This makes it possible to make, as compared with a case where the gap G1 extends obliquely relative to the tire axial direction D1, small stones or the like to less liable to enter the gap G1 and reduce the possibility of stones being caught in the gap G1.

It is preferable that a width W1 of each protrusion 33 be greater than or equal to 2 mm. This makes it possible to make the protrusions 33 strong enough and reduce the possibility of the protrusions 33 being chipped due to caught stones. It is more preferable that the width W1 of each protrusion 33 be greater than or equal to 3 mm. In the present embodiment, the width W1 of the each protrusion 33 is 4 mm, but is not limited to 4 mm. The width W1 of each protrusion 33 is greater than a width W3 of the gap G1 and a width W4 of the gap G2, but is not limited to such a configuration.

As illustrated in FIG. 3, it is preferable that the main groove wall surface 3a of the zigzag main groove 3 include a first main groove wall surface 31a extending inward from the tread surface 2a in the tire radial direction D2 so as to incline toward a center of the zigzag main groove in a tire axial direction, and the second main groove wall surface 32a extending from the first main groove wall surface 31a to the bottom surface 3b so as to incline toward the center of the zigzag main groove in the tire axial direction or in parallel with the tire radial direction, a pair of the second main groove wall surfaces 32a and 32a extend to the bottom surface 3b with a constant width, but are not limited to such a configuration.

It is preferable that a second wall surface angle θ2 between the second main groove wall surface 32a and the tread surface 2a be less than a first wall surface angle θ1 between the first main groove wall surface 31a and the tread surface 2a. This makes it possible to make small stones or the like less liable to enter the second main groove wall surface 32a side and reduce the possibility of stones being caught in the zigzag main groove 3. As a result, small stones or the like become less liable to reach the bottom surface 3b, and it is therefore possible to reduce the possibility of damage to the zigzag main groove 3.

In the present embodiment, the second wall surface angle θ2 is 90 degrees. That is, the pair of second main groove wall surfaces 32a and 32a are parallel to each other. This makes it possible to make the width of the bottom surface 3b in the tire axial direction D1 large enough. As a result, it is possible to make the width W1 of each protrusion 33 to be described later large enough and increase an effect of reducing the possibility of stones being caught.

A height H2 of the second main groove wall surface 32a is less than a height H1 of the first main groove wall surface 31a. That is, a ratio of the height H2 to a depth H3 (height H1+height H2) of the zigzag main groove 3 is less than a ratio of the height H1 to the depth H3. It is preferable that the height H1 of the first main groove wall surface 31a be greater than or equal to 60% and less than or equal to 80% of the depth H3 of the zigzag main groove 3.

It is preferable that the height H2 of the second main groove wall surface 32a be greater than or equal to 20% of the depth H3 of the zigzag main groove 3. This makes it possible to increase, by providing the protrusions 33, the effect of reducing the possibility of stones being caught. It is preferable that the height H2 of the second main groove wall surface 32a be less than or equal to 40% of the depth H3 of the zigzag main groove 3. This makes it possible to make the volume of the zigzag main groove 3 large enough and make drainage performance of the zigzag main groove 3 high enough.

Here, the height H1 of the first main groove wall surface 31a is obtained as a distance in the tire radial direction D2 from an intersection of the first main groove wall surface 31a and the second main groove wall surface 32a to the tread surface 2a. The height H2 of the second main groove wall surface 32a is obtained as a distance in the tire radial direction D2 from the bottom surface 3b to the intersection of the first main groove wall surface 31a and the second main groove wall surface 32a. A height H4 of each protrusion 33 is obtained as a distance in the tire radial direction D2 from the bottom surface 3b to the upper surface of the protrusion 33. A height H5 of each connection portion 34 is obtained as a distance in the tire radial direction D2 from the bottom surface 3b to the upper surface of the connection portion 34.

It is preferable that the height H4 of each protrusion 33 be less than or equal to the height H2 of the second main groove wall surface 32a. This makes it possible to reduce the possibility of stones being caught in the gap (gap G2) between each protrusion 33 and the main groove wall surface 3a. In the present embodiment, the height H4 of each protrusion 33 is substantially equal to the height H2 of the second main groove wall surface 32a, but is not limited to such a configuration.

It is preferable that the height H4 of each protrusion 33 be greater than or equal to 20% of the depth H3 of the zigzag main groove 3. This makes it possible to reduce the possibility of stones being caught in the gap (gap G2) between each protrusion 33 and the main groove wall surface 3a. It is preferable that the height H4 of each protrusion 33 be less than or equal to 40% of the depth H3 of the zigzag main groove 3. This makes it possible to make the protrusions 33 strong enough and reduce the possibility of the protrusions 33 being chipped due to caught stones.

As illustrated in FIGS. 2 and 3, the connection portions 34 each have a plate shape and extend upward from the bottom surface 3b of the zigzag main groove 3. The connection portions 34 are provided for the protrusions 33 on a one-to-one basis (however, as in the present embodiment, it is preferable that a protrusion 33 located at a sector end Se of a vulcanization mold be excepted). In the present embodiment, the sector end Se is provided at the center of a protrusion 33 in the tire circumferential direction D3, but is not limited to such a configuration. Even if no connection portion 34 is provided for the protrusion 33 located at the sector end Se, there is no problem of rubber flow to the protrusion 33 during vulcanization molding, and the drainage performance of the zigzag main groove 3 increases due to no connection portion 34 being provided for the protrusion 33.

Note that the tire 1 is obtained by vulcanization and molding with a segmented tire vulcanization mold. The mold has an annular tread mold for molding the tread 13 (see FIG. 1), and the tread mold includes a plurality of sectors separate along the tire circumferential direction D3. The sector end Se is an end of each sector in the tire circumferential direction D3 and corresponds to a division position of the sector.

It is preferable that the connection portions 34 be provided alternately along the tire circumferential direction D3 with the protrusions 33 interposed between the connection portions 34. Such a configuration makes it possible to suppress an imbalance in rigidity of the center land 6 adjacent to the zigzag main groove 3 and suppress uneven wear of the center land 6.

Protrusions 33 adjacent to each other at any position (except the protrusion 33 located at the sector end Se) are denoted as a first protrusion 331 and a second protrusion 332, a connection portion 34 connected to the first protrusion 331 is denoted as a first connection portion 341, and a connection portion 34 connected to the second protrusion 332 is denoted as a second connection portion 342. It is preferable that the first connection portion 341 connects the first protrusion 331 to the main groove wall surface 3a on one side in the tire axial direction D1, and the second connection portion 342 connects the second protrusion 332 to the main groove wall surface 3a on the other side in the tire axial direction D1.

A longitudinal direction of each connection portion 34 is inclined relative to the tire axial direction D1. Each connection portion 34 connects between the center of the second protrusion wall surface 33b in the longitudinal direction and the second main groove wall surface 32a. It is preferable that a connection wall surface 34a of each connection portion 34 and the second protrusion wall surface 33b be substantially orthogonal to each other. It is preferable that the connection wall surface 34a and the second main groove wall surface 32a be substantially orthogonal to each other.

As illustrated in FIG. 2, it is preferable that a width W2 of each connection portion 34 be greater than or equal to 1 mm. This makes it possible to reinforce the protrusions 33 and reduce the possibility of the protrusions 33 being chipped due to caught stones. The width W2 of each connection portion 34 is less than the width W1 of each protrusion 33. It is preferable that the width W2 of each connection portion 34 be less than the length L1 of each protrusion 33 in the tire circumferential direction D3. This makes it possible to make the drainage performance of the zigzag main groove 3 high enough and prevent the groove width of the zigzag main groove 3 from appearing narrow at the end of wear. The width W2 of each connection portion 34 may be constant from the top to the bottom, or may gradually increase from the top surface to the bottom.

As illustrated in FIG. 3, it is preferable that the height H5 of each connection portion 34 be less than or equal to the height H4 of each protrusion 33. It is preferable that the height H5 of each connection portion 34 be less than or equal to the height H2 of the second main groove wall surface 32a. In the present embodiment, the height H5 of each connection portion 34 is equal to the height H4 of each protrusion 33, and the upper surface of each connection portion 34 is flush with the upper surface of each protrusion 33, but the connection portion 34 is not limited to such a configuration.

It is preferable that the gap G1 between the protrusions 33 and 33 coincide with any one of the projections 31 or the depressions 32 formed by one main groove wall surface 3a as viewed in the tire axial direction D1. Such a configuration is advantageous in providing one protrusion 33 in one linear section 35 of the zigzag main groove 3. It is possible to increase, by providing one protrusion 33 in one linear section 35, the strength of each protrusion 33 as compared with a case where a plurality of protrusions 33 are provided in one linear section 35, and reduce the possibility of the protrusions 33 being chipped due to caught stones.

It is preferable that the width W3 of the gap G1 be greater than or equal to 1.5 mm. This makes it possible to make the drainage performance of the zigzag main groove 3 high enough. It is preferable that the width W3 of the gap G1 be less than or equal to 3 mm. This makes it possible to reduce the possibility of stones being caught in the gap G1. In the present embodiment, the width W3 of the gap G1 is 2 mm, but is not limited to 2 mm. It is preferable that the gap G1 extends with a constant width in the tire axial direction D1. This makes it possible to prevent the gap G1 from partially becoming wider and reduce the possibility of stones being caught in the gap G1.

It is preferable that the width W4 of the gap G2 between the protrusions 33 and the main groove wall surface 3a (second main groove wall surface 32a) be greater than or equal to 1 mm. This makes it possible to make the drainage performance of the zigzag main groove 3 high enough. It is preferable that the width W4 of the gap G2 be less than or equal to 4 mm. This makes it possible to reduce the possibility of stones being caught in the gap G2. In the present embodiment, the width W4 of the gap G2 is 3 mm, but is not limited to 3 mm. The width W4 of the gap G2 is greater than the width W3 of the gap G1.

The tire 1 includes the shoulder lands 7 and 7 each formed on an outer side of a corresponding one of the shoulder main grooves 5 in the tire axial direction D1, and the center lands 6 and 6 each formed between a corresponding one of the shoulder main grooves 5 and the zigzag main groove 3 (center main groove 4). Each center land 6 is formed adjacent to the zigzag main groove 3 and is provided in an inner region of the tread surface 2a in the tire axial direction D1. Each shoulder land 7 is provided in an outer region of the tread surface 2a in the tire axial direction D1. Each center land 6 includes a plurality of center blocks 61 defined by lateral grooves 8 to be described later.

In the present embodiment, the tire 1 has a wide center structure. The wide center structure makes a width Wc of each center land 6 in the tire axial direction D1 greater than or equal to 15%, more preferably 20% of the total land width. It is possible to disperse, by increasing the width Wc of each center land 6 as described above, the ground contact pressure applied to the center lands 6, suppress uneven wear of the center lands 6, and increase the uneven wear resistance. The total land width is a width obtained by removing the main grooves 4 and 5 from the tread width Wt in the tire axial direction D1, that is, a width obtained by adding up the respective widths Wc of the pair of center lands 6 and 6 and the respective widths Ws of the pair of shoulder lands 7 and 7. Note that the widths Wc and Ws are maximum widths of the lands 6 and 7 in the tire axial direction D1, respectively, and are measured on the tread surface 2a (outer peripheral surface of the lands 6 and 7). In the present embodiment, the width Wc of each center land 6 is 26% of the total land width, but is not limited to 26%.

It is preferable that the width Wc of each center land 6 be greater than or equal to 100% and less than or equal to 120% of the width Ws of each shoulder land 7. Such a configuration makes it possible to disperse the ground contact pressure applied to the center lands 6 and suppress uneven wear of the center lands 6. In order to appropriately achieve such an effect, it is preferable that the width Wc of each center land 6 be greater than or equal to 15% of the tread width Wt. In the present embodiment, the width Wc of each center land 6 is 20% of the tread width Wt, but is not limited to 20%.

It is preferable that the width Wc of each center land 6 (center block 61) be substantially equal to or greater than a length Lc of each center block 61 in the tire circumferential direction D3. This makes it possible to increase the rigidity of the center blocks 61 during cornering and suppress uneven wear of the center blocks 61.

The tire 1 includes the lateral grooves 8, each extending from a corresponding depression 32 along the tire axial direction D1. The lateral groove 8 are provided in the center lands 6. In the present embodiment, a depth of the lateral grooves 8 is less than the depth of the main grooves 4 and 5 (for example, less than or equal to 2 mm), so that the center lands 6 each serve as like a rib. This makes it possible to suppress uneven wear of the center lands 6 while making the rigidity of the center lands 6 high enough. The lateral grooves 8 are less in groove width than the main grooves 4 and 5. Each groove width is measured on the tread surface 2a with an intersection between the tread surface 2a and the main groove wall surface 3a as a measurement point. Note that the lateral grooves 8 are not limited to those described above.

It is preferable that a degree of coincidence L2 between a lateral groove 8 and a lateral groove 8 provided on the opposite side relative to the zigzag main groove 3 as viewed in the tire axial direction D1 be less than or equal to 10% of a length L3 of each lateral groove 8 in the tire circumferential direction D3. Such a configuration makes it possible to suppress, by dispersedly arranging the lateral grooves 8 that are traction elements, an imbalance in rigidity of the center lands 6 when the tire comes into contact with the ground and suppress uneven wear of the center lands 6. It is more preferable that a lateral groove 8 do not coincide with a lateral grooves 8 provided on the opposite side relative to the zigzag main groove 3 as viewed in the tire axial direction D1.

An angle formed by the zigzag main groove 3 and each lateral groove 8 is a right angle or an obtuse angle. That is, an angle $\theta 3$ of a corner of each center land 6 formed by the zigzag main grooves 3 and each lateral grooves 8 is greater than or equal to 90 degrees.

Each lateral groove 8 includes a pair of intersection portions 81 and 81 that intersect with one of the main grooves 4 and 5 and extend along the tire axial direction D1, and an inclined portion 82 that does not intersect with the main grooves 4 and 5 and is inclined relative to the tire axial direction D1. It is possible to suppress, by providing the inclined portion 82, a sideways skid during cornering while making the traction performance in the tire circumferential direction D3 high enough and suppress uneven wear of the center lands 6.

The pair of intersection portions 81 and 81 are provided at different positions in the tire circumferential direction D3. This makes it possible to provide the inclined portion 82 between the pair of intersection portions 81 and 81. In the present embodiment, the pair of intersection portions 81 and 81 are provided with a space of greater than or equal to a half pitch and less than or equal to 1 pitch of the repetitive pitches of the depressions 32. Each intersection portion 81 located inside in the tire axial direction D1 intersects with the zigzag main groove 3 (center main groove 4), and each intersection portion 81 located outside in the tire axial direction D1 intersects with a corresponding shoulder main groove 5.

It is preferable that each intersection portion 81 be 2 pitches away from another intersection portion 81 adjacent to the intersection portion 81 in the tire circumferential direction D3. This allows two projections 31 to be provided inside each center block 61 in the tire axial direction D1, thereby allowing an increase in traction performance of each center block 61. It is further possible to suppress a decrease in rigidity of the center lands 6 and suppress uneven wear of the center lands 6 as compared with a case where the intersection portion 81 is provided at every pitch.

The center lands 6 are provided with sipes 9. Each sipe 9 is a closed sipe having both ends closed without intersecting with either of the main grooves 4 and 5. Each sipe 9 is provided on a corresponding center block 61 so as not to intersect with any lateral groove 8. Each sipe 9 is a slit having a groove width less than or equal to 1.5 mm. Each sipe 9 coincides with a corresponding protrusion 33 as viewed in the tire axial direction D1.

It is preferable that each sipe 9 be inclined relative to the tire axial direction D1. This makes it possible to suppress, while making the traction performance in the tire circumferential direction D3 high enough, a sideways skid during cornering and suppress uneven wear of the center lands 6.

It is preferable that an inclination angle $\theta 4$ of each sipe 9 relative to the tire axial direction D1 be greater than or equal to 30 degrees. This makes it possible to satisfactorily suppress a sideways skid during cornering. It is preferable that the inclination angle $\theta 4$ be less than or equal to 50 degrees. This makes it possible to make the traction performance in the tire circumferential direction D3 high enough in a satisfactory manner. In the present embodiment, the inclination angle $\theta 4$ is 40 degrees, but is not limited to 40 degrees.

It is preferable that a difference between the inclination angle $\theta 4$ of each sipe 9 and an inclination angle $\theta 5$ of each inclined portion 82 relative to the tire axial direction D1 be less than or equal to 5 degrees. Such a configuration makes it possible to suppress an imbalance in rigidity in the center blocks 61 and suppress uneven wear of the center blocks 61 (center lands 6). In the present embodiment, the inclination angle $\theta 4$ of each sipe 9 is equal to the inclination angle $\theta 5$ of each inclined portion 82, but the inclination angle $\theta 4$ and the inclination angle $\theta 5$ may be different from each other.

It is preferable that the sipes 9 be provided in the center blocks 61 on a one-to-one basis. It is preferable that each sipe 9 be provided at the center of a corresponding center land 6 (center block 61) in the tire axial direction D1 and at the center of the corresponding center block 61 in the tire circumferential direction D3.

It is preferable that a length L4 of each sipe 9 in the tire axial direction D1 be greater than or equal to 20% of the width Wc of each center land 6. This allows an increase in the traction performance and sideways skid resistance of the tire 1. It is preferable that the length L4 of each sipe 9 be less than or equal to 40% of the width Wc of each center land 6. This makes it possible to make the rigidity of the center lands 6 high enough and suppress uneven wear of the center lands 6.

It is preferable that the sipes 9 and the inclined portions 82 be provided at the center of each center land 6 in the tire axial direction D1 so as to coincide with each other as viewed in the tire circumferential direction D3. Such a configuration makes it possible to provide the traction elements at short intervals at the center of each center land 6 in the tire axial direction D1 and effectively increase the traction performance and sideways skid resistance of the tire 1. In the present embodiment, the sipes 9 coincide with only the inclined portions 82 of the lateral grooves 8 as viewed in the tire circumferential direction D3, but are not limited to such a configuration. It is preferable that the length L4 of each sipe 9 be substantially equal to the length L5 of each inclined portion 82 in the tire axial direction D1.

Each sipe 9 does not coincide, as viewed in the tire axial direction D1, with lateral grooves 8 adjacent to the sipe 9 in the tire circumferential direction D3. Each sipe 9 coincides, as viewed in the tire axial direction D1, with a lateral groove 8 (inclined portion 82) provided in a center land 6 different from the center land 6 in which the sipe 9 is provided.

It is preferable that a depth of each sipe 9 be greater than or equal to 60% of the depth H3 (see FIG. 3) of the zigzag main groove 3. This makes it possible to suppress a decrease in the traction performance and sideways skid resistance of the tire 1 at the end of wear. It is preferable that the depth of each sipe 9 be less than or equal to 80% of the depth H3 of the zigzag main groove 3. This makes it possible to make the rigidity of the center lands 6 high enough and suppress uneven wear of the center lands 6. In the present embodiment, the depth of each sipe 9 is 70% of the depth H3 of the zigzag main groove 3, but is not limited to 70%.

It is preferable that the sipe 9 provided in one center land 6 do not coincide with the sipe 9 provided in the other center land 6 as viewed in the tire axial direction D1. Such a configuration makes it possible to suppress, by dispersedly arranging the sipes 9 that are traction elements, an imbalance in rigidity of the center lands 6 when the tire comes into contact with the ground and suppress uneven wear of the center lands 6.

Each shoulder main groove 5 includes a plurality of shoulder sipes 51 extending from a main groove wall surface 5a of the shoulder main groove 5 along the tire axial direction D1. Each shoulder sipe 51 is a one-side closed sipe having one end closed in a corresponding center land 6 or a corresponding shoulder land 7 and the other end opened to a corresponding shoulder main groove 5.

The shoulder sipes 51 are provided on both sides of each shoulder main groove 5 in the tire axial direction D1 and are arranged along the tire circumferential direction D3. This makes it possible to suppress slipping at the respective edges of the lands 6 and 7 and suppress uneven wear caused by preferential wear of the vicinity of the edges.

It is preferable that each shoulder sipe 51 extends widely from a corresponding shoulder main groove 5 along the tire axial direction D1. This makes it possible to suppress concentration of pressure in the vicinity of a tip of each shoulder sipe 51 and suppress a crack in the vicinity of the tip of each shoulder sipe 51.

It is preferable that the number of shoulder sipes 51 arranged within 2 pitches of the depressions 32 be greater than or equal to five. This makes it possible to suppress slipping at the respective edges of the lands 6 and 7 and effectively suppress the uneven wear described above. It is preferable that the number of shoulder sipes 51 arranged within 2 pitches of the depressions 32 be less than or equal to 15. This makes it possible to makes a distance between the shoulder sipes 51 and 51 adjacent to each other long enough and suppress a crack in the vicinity of the distal end of each shoulder sipe 51. In the present embodiment, the number of shoulder sipes 51 arranged within 2 pitches of the depressions 32 is 10.

It is preferable that the depth of each shoulder sipe 51 be greater than or equal to 40% of a depth H6 (see FIG. 4) of each shoulder main groove 5. This makes it possible to satisfactorily achieve the effect of suppressing slipping at the respective edges of the lands 6 and 7 at the end of wear of the tire 1. It is preferable that the depth of each shoulder sipe 51 be less than or equal to 70% of the depth H6 of each shoulder main groove 5. This makes it possible to make the rigidity of each of the lands 6 and 7 high enough and suppress uneven wear of each of the lands 6 and 7. In the present embodiment, the depth of each shoulder sipe 51 is 66% of the depth H6 of each shoulder main groove 5.

Figure 4:
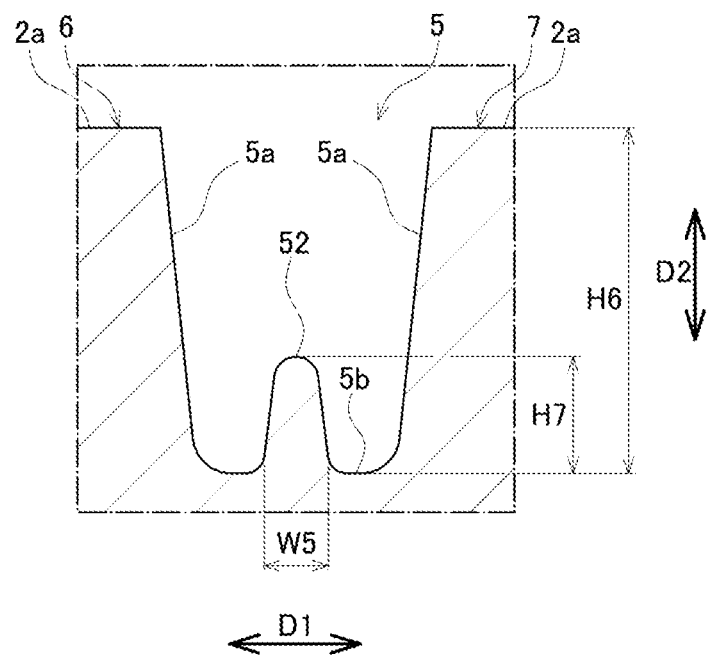
FIG. 4 is an enlarged cross-sectional view taken along a line IV-IV of FIG. 2.

As illustrated in FIG. 4, each shoulder main groove 5 includes a shoulder protrusion 52 protruding from a bottom surface 5b of the shoulder main groove 5. The shoulder protrusion 52 is not connected to the main groove wall surface 5a of a corresponding shoulder main groove 5 and continuously extends along the tire circumferential direction D3. This makes it possible to increase the rigidity of the shoulder main grooves 5 and suppress deformation of the shoulder main grooves 5 when the tire comes into contact with the grounding. As a result, it is possible to suppress uneven wear of each of the lands 6 and 7. It is further possible to reduce the possibility of stones being caught in the shoulder main grooves 5.

It is preferable that a width W5 of each shoulder protrusion 52 measured on the bottom surface 5b be greater than or equal to 2 mm. This makes it possible to achieve the effect of suppressing deformation of the shoulder main grooves 5 when the tire comes into contact with the ground. A height H7 of each shoulder protrusion 52 is greater than the height H4 (see FIG. 3) of each protrusion 33. In the present embodiment, the height H7 of each shoulder protrusion 52 is 6 mm.

[1]

As described above, a tire 1 includes a plurality of main grooves 4 and 5 extending along a tire circumferential direction D3, in which the plurality of main grooves 4 and 5 include at least one zigzag main groove 3 extending in a zigzag shape along the tire circumferential direction D3, the zigzag main groove 3 includes a plurality of protrusions 33 protruding from a bottom surface 3b of the zigzag main groove 3, and a plurality of connection portions 34 connecting the plurality of protrusions 33 to wall surfaces 3a of the zigzag main groove 3, and the plurality of protrusions 33 are arranged so as to overlap with each other as viewed in the tire circumferential direction D3.

Such a configuration makes it possible to reduce exposure of a gap G1 between the protrusions 33 and 33 as viewed in the tire circumferential direction D3. This makes it possible to make small stones or the like less liable to enter the gap G1 and reduce the possibility of stones being caught in the gap G1 between the protrusions 33 and 33.

[2]

In the tire 1 according to the above [1], it is preferable that the connection portions 34 be provided alternately along the tire circumferential direction D3 with the protrusions 33 interposed between the connection portions 34.

Such a configuration makes it possible to suppress an imbalance in rigidity of the land (center land 6) adjacent to the zigzag main groove 3 and suppress uneven wear of the land (center land 6).

[3]

In the tire 1 according to the above [1] or [2], it is preferable that a gap G1 between the protrusions 33 and 33 coincide with any one of a projection 31 or a depression 32 formed by one of the wall surfaces 3a of the zigzag main groove 3 as viewed in a tire axial direction D1.

Such a configuration is advantageous in providing one protrusion 33 in one linear section 35 of the zigzag main groove 3. It is possible to increase, by providing one protrusion 33 in one linear section 35, the strength of each protrusion 33 as compared with a case where a plurality of protrusions 33 are provided in one linear section 35, and reduce the possibility of the protrusions 33 being chipped due to caught stones.

[4]

In the tire 1 according to any one of the above [1] to [3], it is preferable that the plurality of main grooves 4 and 5 include a pair of shoulder main grooves 5 and 5 located on outermost sides in the tire axial direction D1, and a center main groove 4 located between the pair of shoulder main grooves 5 and 5, a shoulder land 7 formed on an outer side of each of the shoulder main grooves 5 in the tire axial direction D1 and a center land 6 formed between each of the shoulder main grooves 5 and the center main groove 4 be included, the zigzag main groove 3 be the center main groove 4, and a width Wc of the center land 6 be greater than or equal to 100% and less than or equal to 120% of a width Ws of the shoulder land 7.

Such a configuration makes it possible to disperse the ground contact pressure applied to the center land 6 and suppress uneven wear of the center land 6.

[5]

It is preferable that the tire 1 according to any one of the above [1] to [4] further include a lateral groove 8 extending along a tire axial direction D1 from a depression 32 formed by each of the wall surfaces 3a of the zigzag main groove 3, and a degree of coincidence L2 between the lateral groove 8 and another lateral groove 8 provided on an opposite side relative to the zigzag main groove 3 as viewed in the tire axial direction D1 be less than or equal to 10% of a length L3 of the lateral groove 8 in the tire circumferential direction D3.

Such a configuration makes it possible to suppress, by dispersedly arranging the lateral grooves 8 that are traction elements, an imbalance in rigidity of the center lands 6 when the tire comes into contact with the ground and suppress uneven wear of the center lands 6.

[6]

It is preferable that the tire 1 according to any one of the above [1] to [5] further include a plurality of lateral grooves 8 each extending along a tire axial direction D1 from a depression 32 formed by each of the wall surfaces 3a of the zigzag main groove 3, the lateral grooves 8 each include an inclined portion 82 that does not intersect with the main grooves 4 and 5 and is inclined relative to the tire axial direction D1, a sipe 9 inclined relative to the tire axial direction D1 be provided in a block (center block 61) formed by the zigzag main groove 3 and the plurality of lateral grooves 8, and a difference between an inclination angle θ4 of the sipe 9 and an inclination angle θ5 of the inclined portion 82 be less than or equal to 5 degrees.

Such a configuration makes it possible to suppress an imbalance in rigidity in the center blocks 61 and suppress uneven wear of the center blocks 61 (center lands 6).

[7]

In the tire 1 according to any one of the above [1] to [6], it is preferable that a sipe 9 be provided in a land (center land 6) formed adjacent to the zigzag main groove 3, the sipe 9 be inclined relative to a tire axial direction D1, and a length L4 of the sipe 9 in the tire axial direction D1 be greater than or equal to 20% and less than or equal to 40% of a width (width Wc) of the land (center land 6) in which the sipe 9 is provided.

Such a configuration makes it possible to increase, by making the length L4 of the sipe 9 greater than or equal to 20% of the width (width Wc) of the land (center land 6), the traction performance and sideways skid resistance of the tire 1. It is possible to make, by making the length L4 of the sipe 9 less than or equal to 40% of the width (width Wc) of the land (center land 6), the rigidity of the center land 6 high enough and suppress uneven wear of the center land 6.

[8]

It is preferable that the tire 1 according to any one of the above [1] to [7] further include a lateral groove 8 extending along the tire axial direction D1 from a depression 32 formed by each of the wall surfaces 3a of the zigzag main groove 3, the lateral groove 8 include an inclined portion 82 that does not intersect with the main grooves 4 and 5 and be inclined relative to the tire axial direction D1, and the sipe 9 and the inclined portion 82 be provided at a center of the land (center land 6) in the tire axial direction D1.

Such a configuration makes it possible to provide the traction elements at short intervals at the center of the center land 6 in the tire axial direction D1 and effectively increase the traction performance and sideways skid resistance of the tire 1.

[9]

In the tire 1 according to any one of the above [1] to [8], it is preferable that a sipe 9 that does not intersect with any of the plurality of main grooves 4 and 5 be provided in each of two lands (a pair of center lands 6 and 6) formed adjacent to the zigzag main groove 3, and the sipe 9 provided in one of the lands (center lands 6) does not coincide with the sipe 9 provided in the other of the lands (center lands 6) as viewed in a tire axial direction D1.

Such a configuration makes it possible to suppress, by dispersedly arranging the sipes 9 that are traction elements, an imbalance in rigidity of the center lands 6 when the tire comes into contact with the ground and suppress uneven wear of the center lands 6.

Note that the tire 1 is not limited to the configuration of the embodiment described above and is not limited to the operation and effect described above. It is needless to say that various modifications can be made to the tire 1 within a range not departing from the gist of the present invention. For example, it is needless to say that one or more configurations, methods, and the like according to various modification examples described below may be arbitrarily selected and adopted in the configuration, method, and the like according to the embodiment described above.

(A) In the present embodiment, the main groove wall surface 3a of the zigzag main groove 3 includes the first main groove wall surface 31a and the second main groove wall surface 32a, but is not limited to such a configuration. For example, the main groove wall surface 3a may be one surface extending from the tread surface 2a to the bottom surface 3b. Specifically, the main groove wall surface 3a of the zigzag main groove 3 may be a surface like the main groove wall surface 5a of the shoulder main groove 5.

Figure 5:
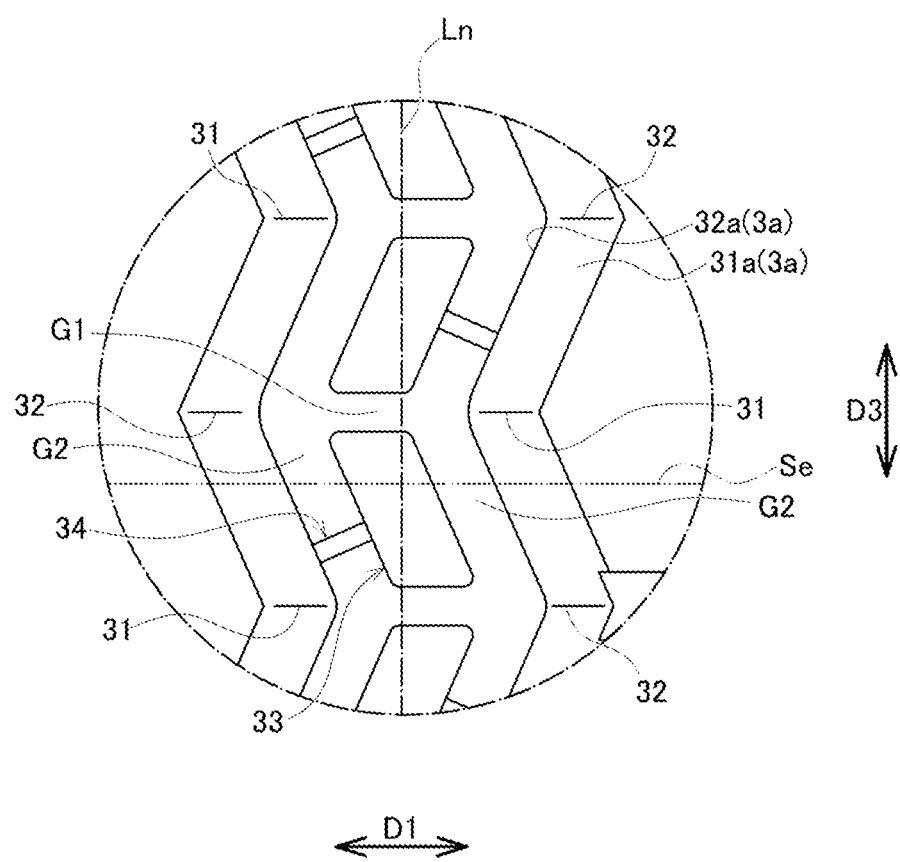
FIG. 5 is an enlarged view of a main part of a tread surface of a pneumatic tire according to another embodiment.

(B) In the present embodiment, the sector end Se is provided at the center of the protrusion 33 in the tire circumferential direction D3, but is not limited to such a configuration. For example, as illustrated in FIG. 5, the sector end Se may be provided on one side of the protrusion 33 in the tire circumferential direction D3. In such an example, the connection portion 34 may be provided on the protrusion 33 located at the sector end Se. It is preferable that the connection portion 34 be connected to a portion having a larger volume of the protrusion 33 divided at the sector end Se.

What is claimed is:

1. A pneumatic tire comprising:
a plurality of main grooves extending along a tire circumferential direction, wherein
the plurality of main grooves include at least one zigzag main groove extending in a zigzag shape along the tire circumferential direction,
the zigzag main groove includes a plurality of protrusions protruding from a bottom surface of the zigzag main groove, and a plurality of connection portions connecting the plurality of protrusions to a wall surface of the zigzag main groove, and
the plurality of protrusions are arranged so as to overlap with each other as viewed in the tire circumferential direction,
wherein the plurality of main grooves include a pair of shoulder main grooves located on outermost sides in the tire axial direction, and a center main groove located between the pair of shoulder main grooves,
a shoulder land formed on an outer side of each of the shoulder main grooves in the tire axial direction and a center land formed between each of the shoulder main grooves and the center main groove are included,
the zigzag main groove is the center main groove, and
a width of the center land is greater than or equal to 100% and less than or equal to 120% of a width of the shoulder land,
wherein the shoulder main grooves extend linearly along the tire circumferential direction.

2. The pneumatic tire according to claim 1, wherein the connection portions are provided alternately along the tire circumferential direction with the protrusions interposed between the connection portions.

3. The pneumatic tire according to claim 1, wherein a gap between the protrusions coincides with any one of a projection or a depression formed by one of the wall surfaces of the zigzag main groove as viewed in a tire axial direction.

4. The pneumatic tire according to claim 3, wherein protrusions adjacent to each other of the protrusions are symmetrically arranged with respect to a tire meridian plane passing through the gap.

5. The pneumatic tire according to claim 3, wherein the protrusions are each provided between the projection and the depression.

6. The pneumatic tire according to claim 3, wherein the gap extends linearly along the tire axial direction.

7. The pneumatic tire according to claim 6, wherein width of the gap is greater than or equal to 1.5 mm and less than or equal to 3 mm.

8. The pneumatic tire according to claim 1, wherein the width of the center land is greater than or equal to 15% of a tread width.

9. The pneumatic tire according to claim 1, further comprising a lateral groove extending along a tire axial direction from a depression formed by the wall surface of the zigzag main groove, wherein
a degree of coincidence between the lateral groove and another lateral groove provided on an opposite side relative to the zigzag main groove as viewed in the tire axial direction is less than or equal to 10% of a length of the lateral groove in the tire circumferential direction.

10. The pneumatic tire according to claim 9, wherein an angle formed by the zigzag main groove and the lateral groove is a right angle or an obtuse angle.

11. The pneumatic tire according to claim 1, further comprising a plurality of lateral grooves each extending along a tire axial direction from a depression formed by the wall surface of the zigzag main groove, wherein
the lateral grooves each include an inclined portion that does not intersect with the main grooves and is inclined relative to the tire axial direction,
a sipe inclined relative to the tire axial direction is provided in a block formed by the zigzag main groove and the plurality of lateral grooves, and
a difference between an inclination angle of the sipe and an inclination angle of the inclined portion is less than or equal to 5 degrees.

12. The pneumatic tire according to claim 1, wherein
a sipe is provided in a land formed adjacent to the zigzag main groove,
the sipe is inclined relative to a tire axial direction, and
a length of the sipe in the tire axial direction is greater than or equal to 20% and less than or equal to 40% of a width of the land in which the sipe is provided.

13. The pneumatic tire according to claim 12, further comprising a lateral groove extending along the tire axial direction from a depression formed by the wall surface of the zigzag main groove, wherein
the lateral groove includes an inclined portion that does not intersect with the main grooves and is inclined relative to the tire axial direction, and
the sipe and the inclined portion are provided at a center of the land in the tire axial direction.

14. The pneumatic tire according to claim 1, wherein
a sipe that does not intersect with any of the plurality of main grooves is provided in each of two lands formed adjacent to the zigzag main groove, and
the sipe provided in one of the lands does not coincide with the sipe provided in another of the lands as viewed in a tire axial direction.

15. The pneumatic tire according to claim 14, wherein the sipe coincides with the protrusions as viewed in the tire axial direction.

16. The pneumatic tire according to claim 1, wherein
the wall surface of the zigzag main groove includes a first main groove wall surface extending inward from a tread surface in a tire radial direction so as to incline toward a center of the zigzag main groove in a tire axial direction, and a second main groove wall surface extending from the first main groove wall surface to the bottom surface so as to incline toward the center of the zigzag main groove in the tire axial direction or in parallel with the tire radial direction, and
a height of the protrusions is less than or equal to a height of the second main groove wall surface.

17. The pneumatic tire according to claim 16, wherein a height of the connection portions is equal to or less than the height of the protrusions.

18. The pneumatic tire according to claim 1, wherein a height of the protrusions is greater than or equal to 20% and less than or equal to 40% of a depth of the zigzag main groove.

* * * * *